J. R. CHURCHILL.
VEHICLE WHEEL.
APPLICATION FILED MAR. 27, 1918.

1,299,301.

Patented Apr. 1, 1919.
3 SHEETS—SHEET 1.

Inventor
J. R. Churchill
By J. M. Irwin
Attorney.

J. R. CHURCHILL.
VEHICLE WHEEL.
APPLICATION FILED MAR. 27, 1918.

1,299,301.

Patented Apr. 1, 1919.
3 SHEETS—SHEET 2.

Inventor
J. R. Churchill
By ........ Attorney.

J. R. CHURCHILL.
VEHICLE WHEEL.
APPLICATION FILED MAR. 27, 1918.
1,299,301.
Patented Apr. 1, 1919.
3 SHEETS—SHEET 3.
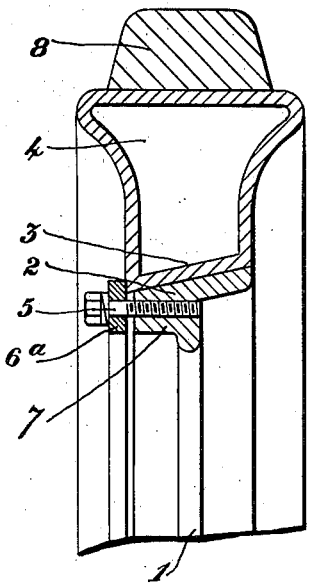
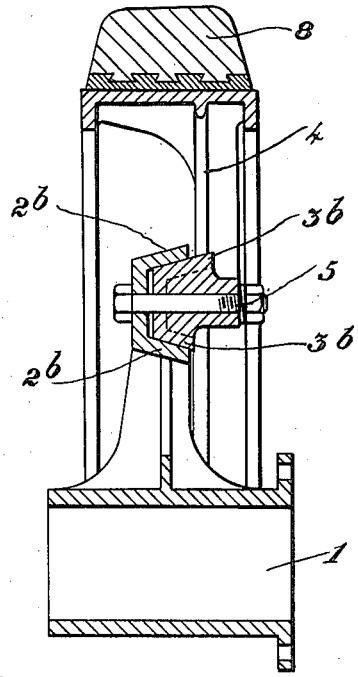
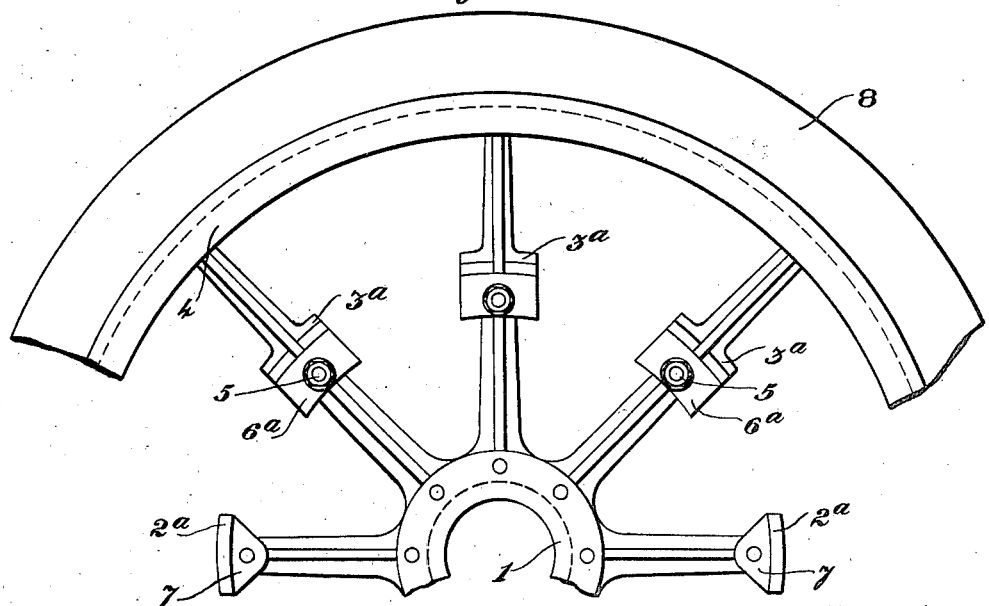

UNITED STATES PATENT OFFICE.

JAMES R. CHURCHILL, OF SHEFFIELD, ENGLAND.

VEHICLE-WHEEL.

1,299,301.         Specification of Letters Patent.     Patented Apr. 1, 1919.

Application filed March 27, 1918. Serial No. 225,052.

*To all whom it may concern:*

Be it known that I, JAMES REGINALD CHURCHILL, a subject of His Majesty the King of England, and resident of Sheffield, in the county of York, Kingdom of England, have invented a certain new and useful Vehicle-Wheel, of which the following is a specification.

My invention relates to wheels made entirely of metal, for motor and other vehicles, and has for its objects to cheapen and improve the construction of such wheels and to provide means whereby tires may be changed without the employment of hydraulic or other presses and without the necessity for the removal of the entire wheel from its axle.

A wheel constructed according to my invention comprises essentially two main portions, an outer portion and an inner or hub portion provided with respectively inwardly and outwardly directed spokes, flanges or equivalent adapted to be connected by a coned joint situated intermediate of the outer portion and the inner or hub portion. The outer portion is co-axially mounted upon the hub portion (with or without an interposed medium as hereinafter mentioned) and there secured as by bolts and nuts or their equivalent.

For such co-axial mounting I employ a coned surface or surfaces on the hub portion and a correspondingly coned surface or surfaces within the outer portion of the wheel (or vice versa) with bolts and nuts, studs and nuts or screws (hereinafter referred to as bolts) to draw or force the two portions of the wheel with such a pressure upon the coned surface or surfaces (with or without an interposed medium as hereinafter mentioned) that the resulting friction is sufficient to transmit whatever power may be required and thus to relieve the bolts of all shearing stresses. I make no claim to any frictional transmission of power between the coned surfaces, as such transmission could always be performed by the bolts already mentioned.

Between the coned surfaces of the inner and outer portions of the wheel constructed according to my invention I may employ any suitable material having sufficient density and frictional character — such as paper, fiber, non-corrosive metal or woven fabric — in cases where it is desired to keep the metal surfaces from contact with each other and to insure that the two portions of the wheel are easily separable.

This interposed material eliminates any possibility of the rusting together of the coned surfaces concerned and the interposed material may be employed either in one piece or in two or more pieces as convenient.

Fig. 7 shows a cross section of part of the inner and outer portions of a wheel with a tire.

Fig. 8 shows part of a modified wheel and tire—in side view, *i. e.*, in the plane of rotation.

Fig. 9 is a sectional view of a modified wheel and tire in the plane of axis of the wheel.

Figure 1:
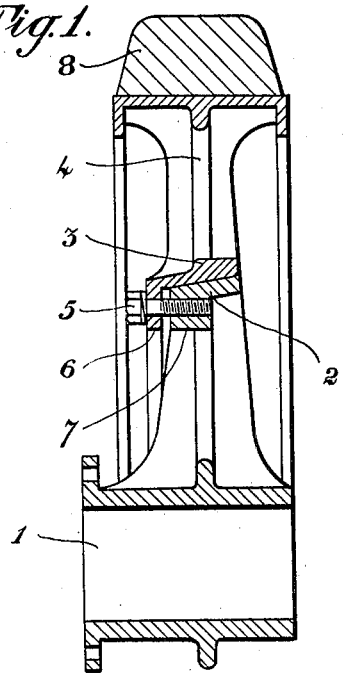
Figure 1 is a sectional view of part of a wheel and tire in the plane of the axis of the wheel.
Figure 2:
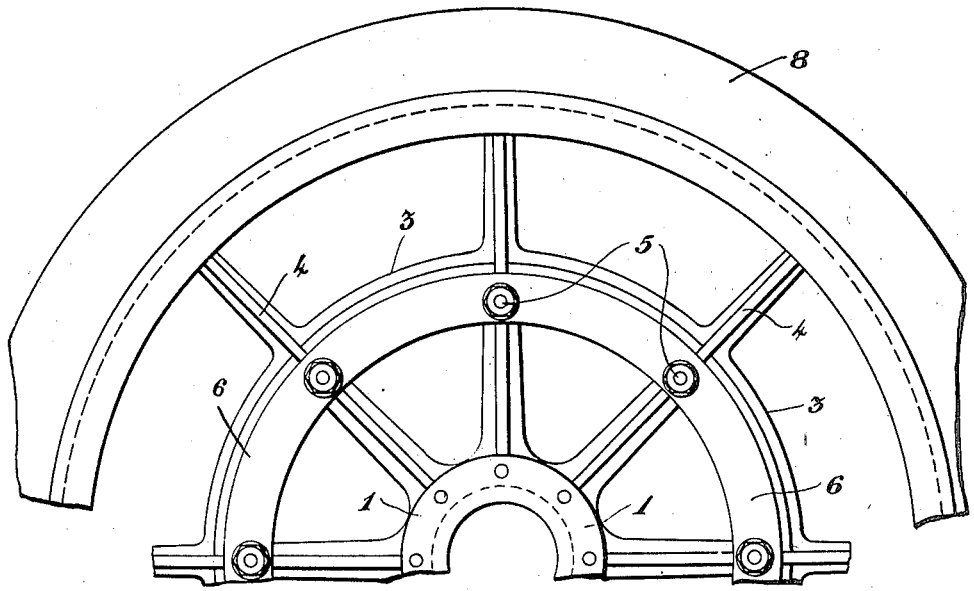
Fig. 2 is a side view of Fig. 1.

Figs. 1 and 2 show a wheel of which the hub portion 1 is provided with the coned part 2 (Fig. 1) on which fits the correspondingly coned part 3 of the outer portion 4.

The screws 5 passing through the flange 6 and into bosses 7 (Fig. 1) cause the coned surfaces to engage and retain them firmly in contact. It will be seen that the flange 6 stands clear of the adjacent face of the hub portion 1.

The hub portion 1 and the outer portion 4, when secured together as described, form the complete wheel. The outer portion 4 is shown fitted with a single tire 8, which may either be vulcanized upon it or pressed upon it in the usual way.

Figure 3:
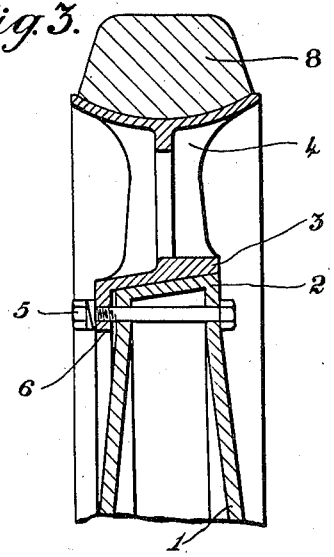
Fig. 3 is a sectional view of part of a wheel and tire in the plane of the axis of the wheel.

Fig. 3 shows a wheel of which the outer portion 4 is modified to receive a single tire 8 with a curved base. This tire is vulcanized directly on the outer portion 4. The hub portion is here shown as made of pressed steel disks welded together.

Figure 4:
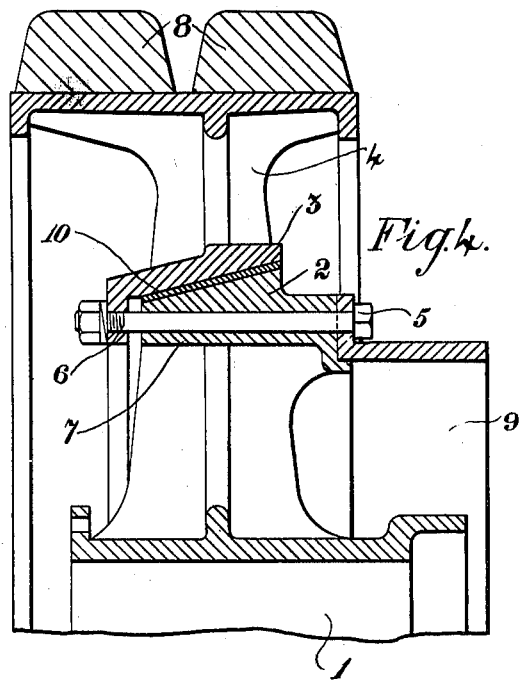
Fig. 4 is a sectional view of part of a rear wheel with twin tires and brake drum.
Figure 5:
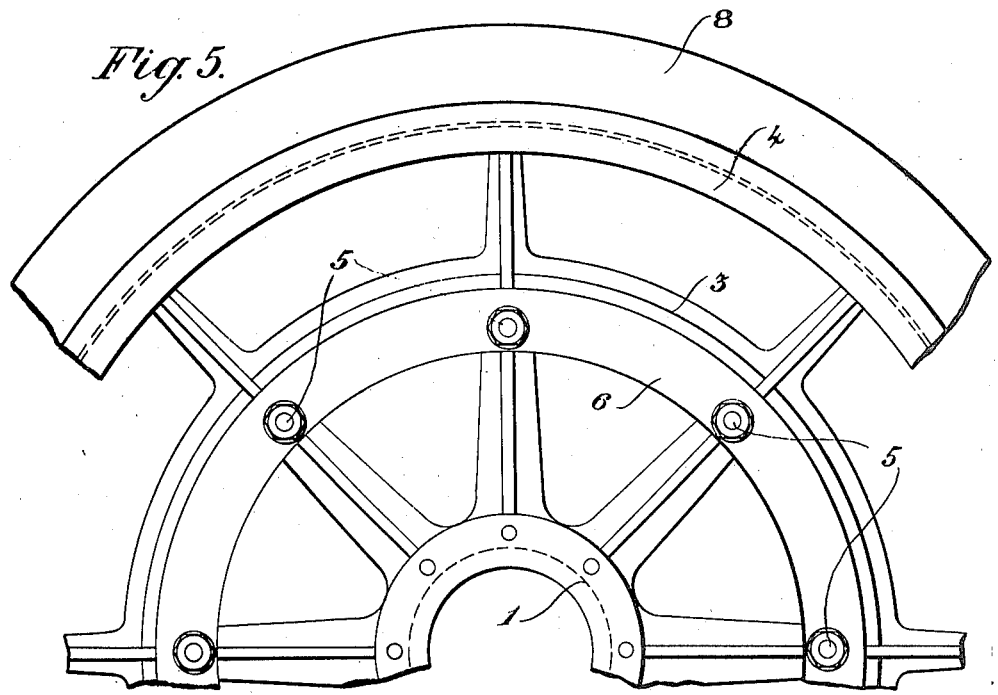
Fig. 5 is a side view of Fig. 4.

Figs. 4 and 5 show a rear wheel comprising the hub portion 1 with the coned part 2 and the outer portion 4 with the coned part 3. The bolts 5 not only hold together the two portions of the wheel but also serve to carry the brake drum 9 (Fig. 1). Interposed material is shown at 10 between the cones 2 and 3.

Figure 6:
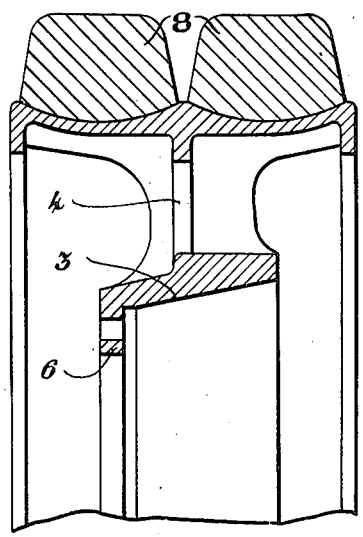
Fig. 6 is a sectional view of part of the outer and hub portions of a wheel and twin tires in the plane of the axis of the wheel.

Fig. 6 shows the outer portion of a wheel 4 provided with twin tires 8, 8 having curved bases. The coned part is shown at 3.

Fig. 7 shows a modified form of outer portion 4 with coned part 3. This can be made as a casting (with suitable holes for the removal of the core) or it can be formed of light steel pressings suitably jointed by welding. This outer portion is shown held in position by the loose flange 6ª and the screws 5.

Fig. 8 shows a modified form in which, for the sake of lightness, the circular continuity of the coned parts is interrupted and conical segments 2ª and 3ª are used instead. The approximately segmental flanges 6ª receive the pressure of the bolts 5.

Fig. 9 shows a special form in which double conical parts 3ᵇ and 3ᵇ are formed on the outer portion and corresponding double conical parts 2ᵇ, 2ᵇ within the hub portion of the wheel. In this figure a tire of the pressed on type is shown.

The operations involved in molding and casting the two portions of such a wheel as described are much more simple than those necessary for the production of an ordinary wheel in one piece; difficulties due to the contraction of the castings of ordinary wheels will disappear because the hub portion is much less in size and weight and the outer portion is less in weight than an ordinary cast wheel of equal strength and of a diameter and width of circumference to correspond with that of the outer portion of the wheel constructed according to my invention. Also the spokes or flanges of the portions of my wheel are much less than the spokes of a wheel of equal diameter and made in one piece.

The wedging action of the cones multiplies the pressure of the bolts upon the conical surfaces of the two portions of the wheel and thus by intensifying the grip makes a very much more reliable and durable joint than can be obtained by equal bolts acting upon parallel surfaces.

The advantages of my invention are obtainable in their greatest degree by making the angle of the cones as acute as possible consistent with their easy separation.

A certain amount of latitude is permissible in regard to the accuracy of machining, because, provided the angle of taper be correct in each of the two portions of the wheel, the necessary contact could always be secured by the operation of the bolts in drawing or forcing the coned surfaces together.

It will be seen that by the use and exercise of my invention, the outer portion of the wheel is suitable to receive the ordinary commercial pressed on tire or that it may form the base of a tire vulcanized directly upon it. It will be evident that the position of the cones may be reversed inasmuch as that the inner cone may be part of the outer portion and the outer cone may be part of the hub portion of the wheel.

It is obvious that the construction according to the present invention enables outer portions of different outer diameters and carrying tires of different sections and different diameters to be interchanged on a common inner or hub portion and further such interchange can be effected without removing the entire wheel from its axle.

I desire it to be understood that the forms of wheel hereinbefore described other than the constructions shown in Figs. 3 and 6 may be used without a rubber tire or tires and that a tire vulcanized directly on the wheel or a pressed on tire may be used as desired.

What I claim is:—

1. An all metal wheel for motor vehicles comprising; an outer portion, including a rim, an outer ring disposed inwardly of the rim in concentric relation thereto and having a conical portion provided with an inwardly projecting annular flange at its reduced end, and spokes connecting the rim and outer ring; an inner portion including a hub, an inner ring surrounding the hub in spaced concentric relation and having a conical face adapted for insertion within the outer ring, and spokes connecting the hub and inner conical ring; and bolts carried by the annular flange and engaging the inner ring to draw the two rings together.

2. An all metal wheel for motor vehicles comprising; an outer portion, including a rim, a male ring arranged inwardly of the rim in concentric relation thereto and having inner and outer conical faces, spokes connecting the rim and male ring; an inner portion including, a hub, a female ring surrounding the hub in spaced concentric relation and having inner and outer conical faces, and spokes connecting the hub and female ring; and bolts passing through the male and female rings to draw them together.

3. An all metal wheel for vehicles comprising; an outer portion, including a rim, a ring disposed inwardly of the rim in spaced concentric relation thereto and having a conical face, and spokes connecting the rim and ring; an inner portion including a hub, a ring surrounding the hub in spaced concentric relation and having a conical face to engage with the first-named conical face, and spokes connecting the hub and second-named ring, an attaching ring arranged near one end of the first-named ring; and bolts carried by the attaching ring and engaging one ring to draw it toward the other ring.

In testimony whereof I have hereunto signed my name.

J. R. CHURCHILL.